June 19, 1951 — P. KAPITZA — 2,557,542
MEANS FOR DAMPING TRANSVERSE OSCILLATIONS OF HIGH SPEED SHAFTS
Filed Feb. 20, 1946 — 2 Sheets-Sheet 1
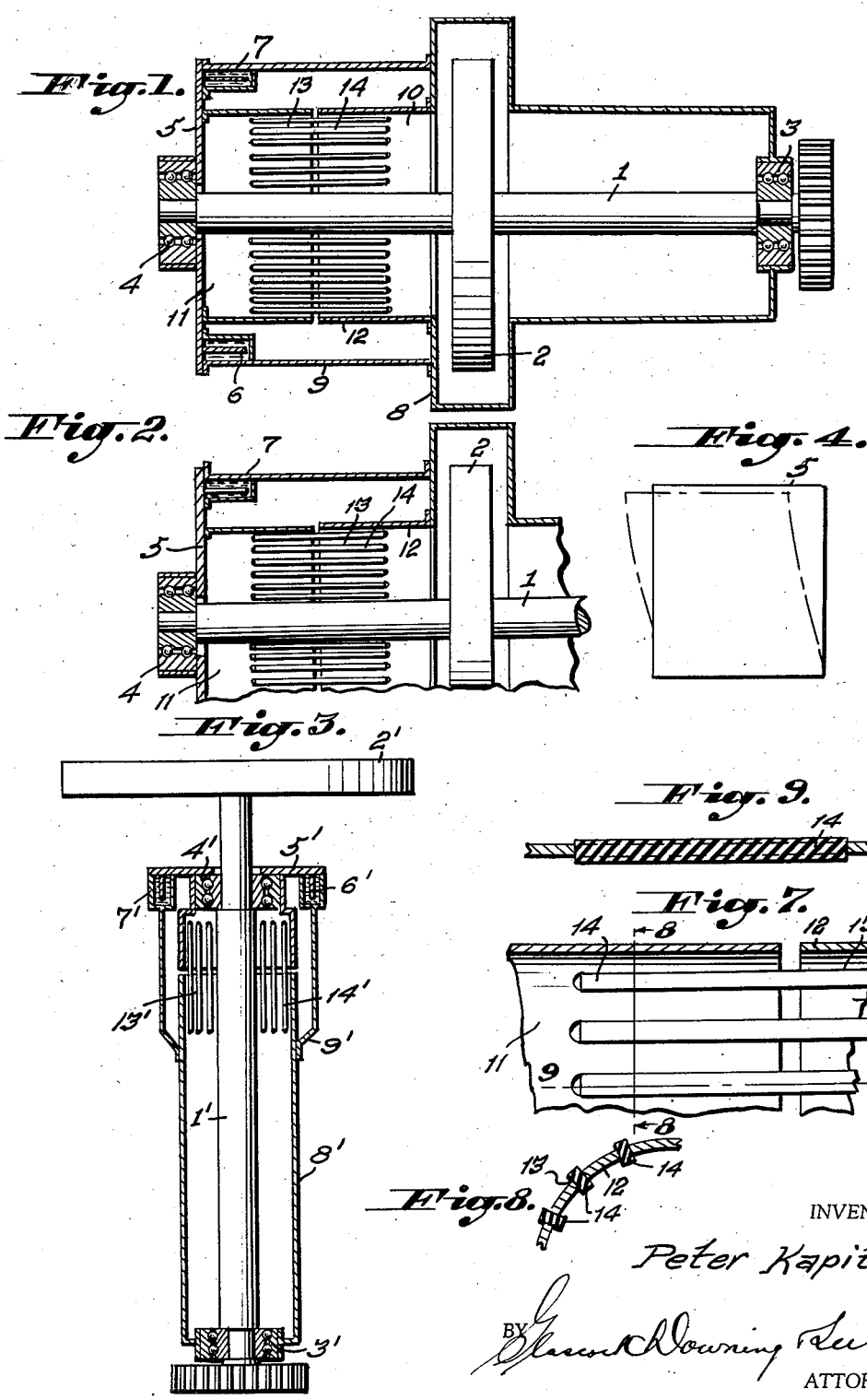
INVENTOR
Peter Kapitza
ATTORNEYS June 19, 1951

P. KAPITZA 2,557,542

MEANS FOR DAMPING TRANSVERSE OSCILLATIONS OF HIGH SPEED SHAFTS

Filed Feb. 20, 1946

INVENTOR
Peter Kapitza
BY Glascock Downing Seebold
ATTORNEYS.

Patented June 19, 1951

2,557,542

UNITED STATES PATENT OFFICE 2,557,542

MEANS FOR DAMPING TRANSVERSE OSCILLATIONS OF HIGH-SPEED SHAFTS

Peter Leonidovitch Kapitza, Moscow, Union of Soviet Socialist Republics

Application February 20, 1946, Serial No. 648,906

5 Claims. (Cl. 74—574)

The present invention relates to means for damping transverse oscillations of high speed shafts.

Means for damping or absorbing oscillatory energy are used to a considerable extent in mechanical engineering.

In practice, up to the present time, these means have been applied mainly to damping out torsional oscillations and providing means for reducing the deleterious effect of variations in the torsional moment of many types of modern engines and machines, the most important of which are internal combustion engines.

The problem of damping transverse oscillations was generally solved by the use of rubbing bearings in which the thin film of lubricating oil serves in part as the means for absorbing the energy of these oscillations.

The proposed invention concerns a damper for transverse oscillations which affords stable operation of high speed rotors mounted on flexible shafts supplied with rolling bearings, the rotor being surrounded by a medium of high density and separated from the casing by a small gap as, for instance, in steam or gas turbines, turbocompressors and expansion turbines.

In the absence of means for damping out transverse vibrations, the rotor of a machine such as that described above will be unstable, even though the critical speed has been satisfactorily passed, because of friction between the rotor and the surrounding working medium such as steam, gas, air, or the like.

The proposed damping means completely eliminates this effect and at the same time permits the shaft and rotor to be smoothly accelerated through the critical speed. A damper embodying the present invention when applied to any machine working at high speeds permits the use of the more efficient roller or ball-bearings in place of ordinary bearings.

Rotors attached to rapidly rotating shafts lose their stability at high speeds, the degree of instability being directly proportional to density of the medium in which they are rotating. This is particularly noticeable in the case of turbine expansion engines used for obtaining low temperatures in which the periferal speed of the rotors reaches high values while the density of the gases being expanded approaches that of liquids owing to the low working temperature. Similar conditions exist in high pressure steam turbines in which the steam used has a high density.

To counteract this condition of instability in the operation of high speed shafts various means have been proposed, chiefly in the form of an auxiliary bearing freely mounted on the shaft. The transverse motion of this bearing is opposed by forces whose reaction is directly proportionate to the amplitude of the transverse oscillations of the shaft causing them.

The author of the present invention has already received patents for such devices (U. S. A. Patent No. 2,220,524, British Patent No. 520,762).

The present device is intended to be used for the same purpose as those of the above mentioned patents but differs from them in that it does not require the use of an additional auxiliary bearing whose motion is opposed by forces reacting against transverse displacements of the shaft. In the present proposal, one of the two main bearings of the shaft replaces the auxiliary bearing, for which purpose it is supplied with a special device permitting its displacement only in a direction parallel to its axis when the shaft is vibrating.

The invention will be described with respect to the appended drawings of which:

Fig. 1 is a longitudinal section showing a high-speed shaft journaled in bearings on both sides of a rotor attached to it and supplied with a damping device;

Fig. 2 is a fragmentary section and shows in exaggerated form the deformation of the shaft of Fig. 1 at the moment of maximum amplitude;

Fig. 3 is a longitudinal section showing a high-speed shaft with a damping device and overhanging rotor.

Fig. 4 illustrates the operation of the damping device;

Fig. 7 is an enlarged fragmentary view of a portion of Fig. 1;

Fig. 8 is a section on the line 8—8 of Fig. 7; and

Fig. 9 is a section on the line 9—9 of Fig. 7.

Figure 5:
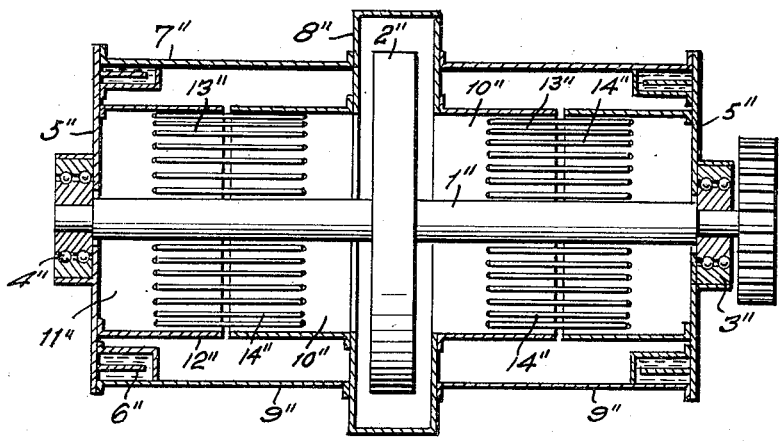
Fig. 5 is a section similar to Fig. 1, showing a high-speed shaft having a rotor placed between two bearings each of which is supplied with a damping device.

Referring to Figure 1, a shaft 1 having a rotor 2, rotates in two bearings 3 and 4, one (3) of which is immoveable while the other (4) is attached to a plate 5 having a cylindrical collar 6 immersed in an annular channel 7 filled with some liquid such as oil. The plate 5 is connected to the casing 8 by means of a metal cylinder 12 in which slots 13 have been made parallel to its axis. The channel 7 is formed on the end 9 of the casing 8. The cylinder 12 consists of two rings 10 and 11, attached to the casing 8 and the plate 5, respectively, and connected together by elastic plates 14.

As a result of the elastic properties of the slotted cylinder 12, the bearing 4 can serve as the usual second bearing of the shaft 1 and the cylinder 12 determines the position of the bearing 4 when the shaft 1 is not in motion. At the same time, the cylinder 12 is sufficiently flexible for use in a damping device. When the shaft 1 vibrates, the plates 14 are deformed. Being of equal elasticity, each individual plate 14 is deformed to an equal extent, no matter in what direction the shaft 1 may be vibrating; as a result the plate 5 carrying the bearing 4 can move only in a direction parallel to its original position, despite any displacement that may take place (see Figures 2–4); consequently the geometric axis of the shaft 1 and bearing 4 remains parallel to its original position.

At the same time, the cylindrical collar 6 in being displaced in the liquid filling the annular channel 7 is subjected to reactive forces proportionate to and caused by the vibrations of the shaft 1. Since the axial direction of the bearing 4 is not changed by the vibration, the bearing 4 operates normally. When the elasticity of the cylindrical system 12 is properly adjusted and its plates 14 are suitably proportioned the shaft may be accelerated through its critical speed of rotation without difficulty.

Figure 6:
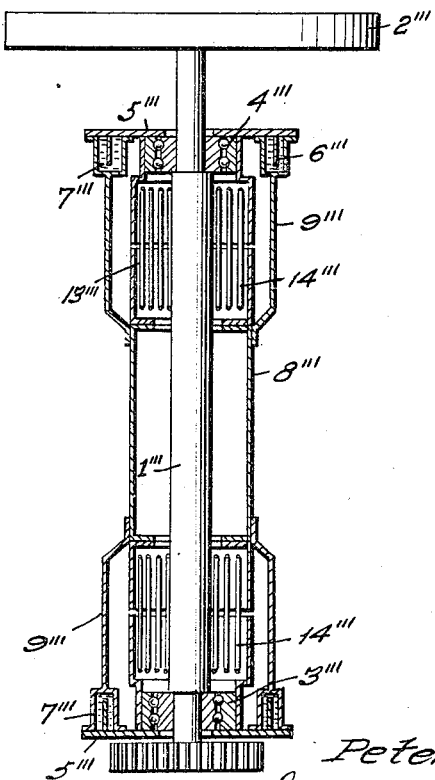
Fig. 6 is a section similar to Fig. 3, showing a high-speed shaft having an overhanging rotor and two bearings, both having damping devices.

The device may be applied to both horizontally and vertically disposed shafts carrying rotors arranged either between bearings or overhanging the bearings as shown in Fig. 3 in which the parts corresponding to the parts in Fig. 1 bear single prime numerals corresponding with the numeral of Fig. 1. Furthermore the device may replace one or both the shaft bearings as shown in Figures 5 and 6 in which the parts corresponding to the parts of Fig. 1 bear double and triple prime numerals corresponding with the numerals of Fig. 1.

Since details of the means for damping transverse oscillations of high speed shafts may be modified, the scope of the invention is defined by the claims as hereunto appended.

I claim:

1. Means for damping out shaft vibrations, the said vibrations being damped out by reactive forces whose magnitude increases together with the amplitude of the said vibrations, the said damping means comprising a bearing, a supporting casing for the bearing, a plate carrying the said bearing, an elastic member connecting said casing and said plate and retaining said plate in a position parallel to its position at rest despite any displacement of the said bearing, a cylinder affixed to the said plate and moveable in an annular channel in the casing, the said channel being filled with a liquid.

2. Means for damping out shaft vibrations, the said vibrations being damped out by reactive forces whose magnitude increases together with the amplitude of the said shaft vibrations, the said damping means comprising a bearing, a supporting casing for the bearing, a plate carrying the said bearing, an elastic member connecting said casing and said plate and retaining said plate in a position parallel to its initial position at rest despite any displacement of the said bearing, a cylinder affixed to the said plate and moveable in an annular space filled with liquid arranged in the casing, said member consisting of a cylindrical system comprising parallel elastic members coupling a ring rigidly affixed to the said plate to a second ring rigidly affixed to the casing.

3. Means for damping out shaft vibrations, the said vibrations being damped out by means of reactive forces whose magnitude increases together with the amplitude of the vibrations of the said shaft, a damping means comprising the said bearing, a supporting casing for the bearing, a plate carrying the said bearing, an elastic member connecting said casing and said plate and retaining said plate in a position parallel to its initial position at rest despite any displacement of the said bearing, a cylinder affixed to the said plate and moveable in an annular channel filled with liquid arranged in the casing said member consisting of a cylindrical system comprising parallel elastic members formed by slitting a thin-walled cylinder along lines parallel to its axis, one end of the said slotted cylinder being rigidly affixed to the said plate, the other end being rigidly affixed to the casing.

4. In a device for damping oscillation of a shaft, the combination of a pair of bearings in which the shaft is journaled; a casing in which one of said bearings is fixed; a plate in which the other of said bearings is fixed; and a member having two resiliently connected elements fixed on said plate and said casing, respectively, said member retaining said plate in a position parallel to its position at rest despite any displacement of the bearing.

5. In a device for damping oscillation of a shaft, the combination of a pair of bearings in which the shaft is journaled; a casing in which one of said bearings is fixed; a plate in which the other of said bearings is fixed; an elastic member connecting said plate and said casing and retaining said plate in a position parallel to its position at rest despite any displacement of the bearing; and a cylinder mounted on said plate moveable in an annular channel in said casing, which is filled with liquid.

PETER LEONIDOVITCH KAPITZA.

REFERENCES CITED

The following references are of record in the file of this patent:

UNITED STATES PATENTS

| Number | Name | Date |
|---|---|---|
| 1,364,994 | Johnson | Jan. 11, 1921 |
| 1,526,709 | Keyser | Feb. 17, 1925 |
| 2,113,390 | Zimmerman | Apr. 5, 1938 |
| 2,138,531 | Wise et al. | Nov. 29, 1938 |
| 2,220,524 | Kapitza | Nov. 5, 1940 |